United States Patent
Bhoja et al.

(10) Patent No.: US 12,260,223 B2
(45) Date of Patent: Mar. 25, 2025

(54) GENERATIVE AI ACCELERATOR APPARATUS USING IN-MEMORY COMPUTE CHIPLET DEVICES FOR TRANSFORMER WORKLOADS

(71) Applicant: d-MATRIX CORPORATION, Cupertino, CA (US)

(72) Inventors: Sudeep Bhoja, Cupertino, CA (US); Siddharth Sheth, Cupertino, CA (US)

(73) Assignee: d-MATRIX CORPORATION, Santa Clara, CA (US)

( * ) Notice: Subject to any disclaimer, the term of this patent is extended or adjusted under 35 U.S.C. 154(b) by 77 days.

(21) Appl. No.: 18/058,706

(22) Filed: Nov. 23, 2022

(65) Prior Publication Data

US 2023/0168899 A1 Jun. 1, 2023

Related U.S. Application Data

(63) Continuation-in-part of application No. 17/538,923, filed on Nov. 30, 2021, now Pat. No. 11,847,072.

(51) Int. Cl.
*G06F 9/38* (2018.01)
*G06F 9/30* (2018.01)
*G06F 13/16* (2006.01)

(52) U.S. Cl.
CPC .......... *G06F 9/3887* (2013.01); *G06F 9/3001* (2013.01); *G06F 9/3836* (2013.01)

(58) Field of Classification Search
CPC . G06F 13/1668; G06F 13/4291; G06F 9/3887
See application file for complete search history.

(56) References Cited

U.S. PATENT DOCUMENTS

2023/0058355 A1\* 2/2023 Hornung ............. G06F 9/30043

\* cited by examiner

*Primary Examiner* — David E Martinez
(74) *Attorney, Agent, or Firm* — Richard T. Ogawa; Ogawa P.C.

(57) ABSTRACT

An AI accelerator apparatus using in-memory compute chiplet devices. The apparatus includes one or more chiplets, each of which includes a plurality of tiles. Each tile includes a plurality of slices, a central processing unit (CPU), and a hardware dispatch device. Each slice can include a digital in-memory compute (DIMC) device configured to perform high throughput computations. In particular, the DIMC device can be configured to accelerate the computations of attention functions for transformer-based models (a.k.a. transformers) applied to machine learning applications, including generative AI. A single input multiple data (SIMD) device configured to further process the DIMC output and compute softmax functions for the attention functions. The chiplet can also include die-to-die (D2D) interconnects, a peripheral component interconnect express (PCIe) bus, a dynamic random access memory (DRAM) interface, and a global CPU interface to facilitate communication between the chiplets, memory and a server or host system.

26 Claims, 18 Drawing Sheets

| IMC – Matrix Multiply |||| | SIMD – Element Wise ||||
| 384 | IMCs |||| | SIMDs |||
| Cycles | AC1 | AC2 | AC3 | AC4 | Cycles | SIMD1 | SIMD2 | SIMD3 | SIMD4 |
|---|---|---|---|---|---|---|---|---|---|
| 1,024 | K1 | K1 | K2 | K2 | | | | | |
| 1,024 | K3 | K3 | K4 | K4 | | | | | |
| 1,024 | K5 | K5 | K6 | K6 | | | | | |
| 1,024 | Q1 | Q1 | Q2 | Q2 | | | | | |
| 1,024 | Q3 | Q3 | Q4 | Q4 | | | | | |
| 1,024 | Q5 | Q5 | Q6 | Q6 | | | | | |
| 1,024 | QKT1 | QKT2 | QKT3 | QKT4 | | | | | |
| 1,024 | QKT5 | QKT6 | V1 | V1 | 3,072 | Smax1 | Smax2 | Smax3 | Smax4 |
| 1,024 | V2 | V2 | V3 | V3 | 3,072 | Smax5 | Smax6 | | |
| 1,024 | V4 | V4 | V5 | V5 | | | | | |
| 1,024 | V6 | V6 | XV1 | XV2 | | | | | |
| 1,024 | XV3 | XV4 | XV5 | XV6 | | | | | |

FIG. 13A

GENERATIVE AI ACCELERATOR APPARATUS USING IN-MEMORY COMPUTE CHIPLET DEVICES FOR TRANSFORMER WORKLOADS

CROSS-REFERENCES TO RELATED APPLICATIONS

The present application is a continuation-in-part application of the following application: U.S. patent application Ser. No. 17/538,923, filed Nov. 30, 2021.

BACKGROUND OF THE INVENTION

The present invention relates generally to integrated circuit (IC) devices and artificial intelligence (AI). More specifically, the present invention relates to methods and device structures for accelerating computing workloads in transformer-based models (a.k.a. transformers), including generative AI applications.

The transformer has been the dominant neural network architecture in the natural language processing (NLP) field, and its use continues to expand into other machine learning applications. The original Transformer was introduced in the paper "Attention is all you need" (Vaswani et al., 2017), which sparked the development of many transformer model variations, such as the generative pre-trained transformer (GPT) and the bidirectional encoder representations from transformers (BERT) models. Such transformers has significantly outperformed other models in inference tasks by their use of a self-attention mechanism that avoids recursion and allows for easy parallelism. On the other hand, the transformer workloads are very computationally intensive and have high memory requirements, and have been plagued as being time-intensive and inefficient.

Most recently, NLP models have grown by a thousand times in both model size and compute requirements. For example, it can take about 4 months for 1024 graphics processing units (GPUs) to train a model like GPT-3 with 175 billion parameters. New NLP models having a trillion parameters are already being developed, and multi-trillion parameter models are on the horizon. Such rapid growth has made it increasingly difficult to serve NLP models at scale.

From the above, it can be seen that improved devices and method to accelerate compute workloads for transformers are highly desirable.

BRIEF SUMMARY OF THE INVENTION

The present invention relates generally to integrated circuit (IC) devices and artificial intelligence (AI) systems. More particularly, the present invention relates to methods and device structures for accelerating computing workloads in transformer-based neural network models (a.k.a. transformers). These methods and structures can be used in machine/deep learning applications such as natural language processing (NLP), computer vision (CV), generative AI, and the like. Merely by way of example, the invention has been applied to AI accelerator apparatuses and chiplet devices configured to perform high throughput operations for NLP.

In an example, the present invention provides for an AI accelerator apparatus using in-memory compute chiplet devices. The apparatus includes one or more chiplets, each of which includes a plurality of tiles. Each tile includes a plurality of slices, a central processing unit (CPU), and a hardware dispatch device. Each slice can include a digital in-memory compute (DIMC) device configured to perform high throughput computations. In particular, the DIMC device can be configured to accelerate the computations of attention functions for transformers applied to machine learning applications, including generative AI applications. A single input multiple data (SIMD) device configured to further process the DIMC output and compute softmax functions for the attention functions. The chiplet can also include die-to-die (D2D) interconnects, a peripheral component interconnect express (PCIe) bus, a dynamic random access memory (DRAM) interface, and a global CPU interface to facilitate communication between the chiplets, memory and a server or host system.

The AI accelerator and chiplet device architecture and its related methods can provide many benefits. With modular chiplets, the AI accelerator apparatus can be easily scaled to accelerate the workloads for transformers of different sizes. The DIMC configuration within the chiplet slices also improves computational performance and reduces power consumption by integrating computational functions and memory fabric. Further, embodiments of the AI accelerator apparatus can allow for quick and efficient mapping from the transformer to enable effective implementation of AI applications, such as generative AI.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIG. 10 is a simplified table representing an example mapping process between a 24-layer transformer and an example eight-chiplet AI accelerator apparatus according to an example of the present invention.

FIGS. 13A-13C are simplified tables illustrating data flow through the IMC and single input multiple data (SIMD) modules according to an example of the present invention.

DETAILED DESCRIPTION OF THE INVENTION

The present invention relates generally to integrated circuit (IC) devices and artificial intelligence (AI) systems. More particularly, the present invention relates to methods and device structures for accelerating computing workloads in transformer-based neural network models (a.k.a. transformers). These methods and structures can be used in machine/deep learning applications such as natural language processing (NLP), computer vision (CV), generative AI, and the like. Merely by way of example, the invention has been applied to AI accelerator apparatuses and chiplet devices configured to perform high throughput operations for NLP.

Currently, the vast majority of NLP models are based on the transformer model, such as the bidirectional encoder representations from transformers (BERT) model, BERT Large model, and generative pre-trained transformer (GPT) models such as GPT-2 and GPT-3, etc. However, these transformers have very high compute and memory requirements. According to an example, the present invention provides for an apparatus using chiplet devices that are configured to accelerate transformer computations for AI applications. Examples of the AI accelerator apparatus are shown in FIGS. 1A and 1B.

Figure 1A:
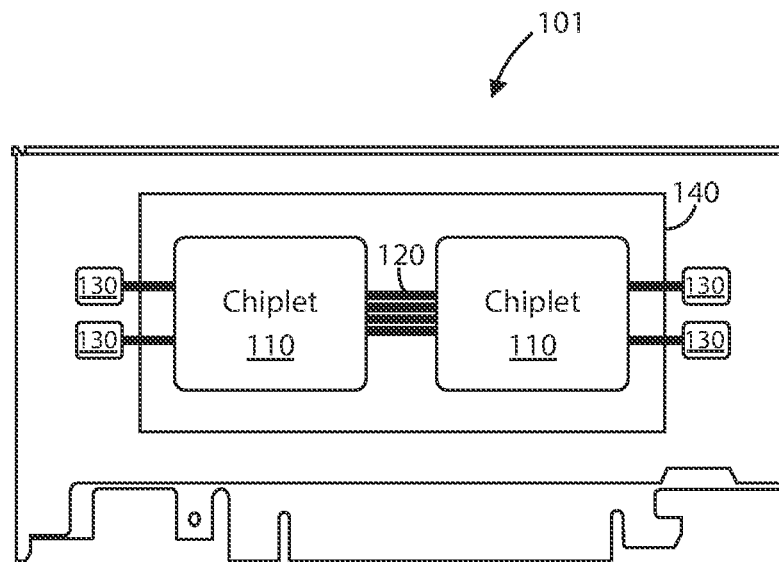
FIG. 1A-1B are simplified block diagrams illustrating AI accelerator apparatuses according to examples of the present invention.

FIG. 1A illustrates a simplified AI accelerator apparatus 101 with two chiplet devices 110. As shown, the chiplet devices 110 are coupled to each other by one or more die-to-die (D2D) interconnects 120. Also, each chiplet device 110 is coupled to a memory interface 130 (e.g., static random access memory (SRAM), dynamic random access memory (DRAM), synchronous dynamic RAM (SDRAM), or the like). The apparatus 101 also includes a substrate member 140 that provides mechanical support to the chiplet devices 110 that are configured upon a surface region of the substrate member 140. The substrate can include interposers, such as a silicon interposer, glass interposer, organic interposer, or the like. The chiplets can be coupled to one or more interposers, which can be configured to enable communication between the chiplets and other components (e.g., serving as a bridge or conduit that allows electrical signals to pass between internal and external elements).

Figure 1B:
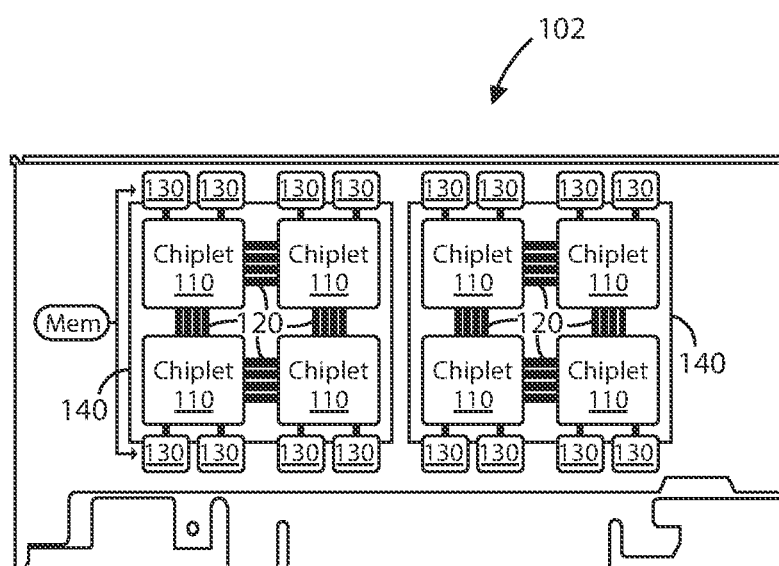

FIG. 1B illustrates a simplified AI accelerator apparatus 102 with eight chiplet devices 110 configured in two groups of four chiplets on the substrate member 140. Here, each chiplet device 110 within a group is coupled to other chiplet devices by one or more D2D interconnects 120. Apparatus 102 also shows a DRAM memory interface 130 coupled to each of the chiplet devices 110. The DRAM memory interface 130 can be coupled to one or more memory modules, represented by the "Mem" block.

As shown, the AI accelerator apparatuses 101 and 102 are embodied in peripheral component interconnect express (PCIe) card form factors, but the AI accelerator apparatus can be configured in other form factors as well. These PCIe card form factors can be configured in a variety of dimensions (e.g., full height, full length (FHFL); half height, half length (HHHL), etc.) and mechanical sizes (e.g., 1×, 2×, 4×, 16×, etc.). In an example, one or more substrate members 140, each having one or more chiplets, are coupled to a PCIe card. Those of ordinary skill in the art will recognize other variations, modifications, and alternatives to these elements and configurations of the AI accelerator apparatus.

Embodiments of the AI accelerator apparatus can implement several techniques to improve performance (e.g., computational efficiency) in various AI applications. The AI accelerator apparatus can include digital in-memory-compute (DIMC) to integrate computational functions and memory fabric. Algorithms for the mapper, numerics, and sparsity can be optimized within the compute fabric. And, use of chiplets and interconnects configured on organic interposers can provide modularity and scalability.

According to an example, the present invention implements chiplets with in-memory-compute (IMC) functionality, which can be used to accelerate the computations required by the workloads of transformers. The computations for training these models can include performing a scaled dot-product attention function to determine a probability distribution associated with a desired result in a particular AI application. In the case of training NLP models, the desired result can include predicting subsequent words, determining contextual word meaning, translating to another language, etc.

The chiplet architecture can include a plurality of slice devices (or slices) controlled by a central processing unit (CPU) to perform the transformer computations in parallel. Each slice is a modular IC device that can process a portion of these computations. The plurality of slices can be divided into tiles/gangs (i.e., subsets) of one or more slices with a CPU coupled to each of the slices within the tile. This tile CPU can be configured to perform transformer computations in parallel via each of the slices within the tile. A global CPU can be coupled to each of these tile CPUs and be configured to perform transformer computations in parallel via all of the slices in one or more chiplets using the tile CPUs. Further details of the chiplets are discussed in reference to FIGS. 2A-5B, while transformers are discussed in reference to FIGS. 6-9.

Figure 2A:
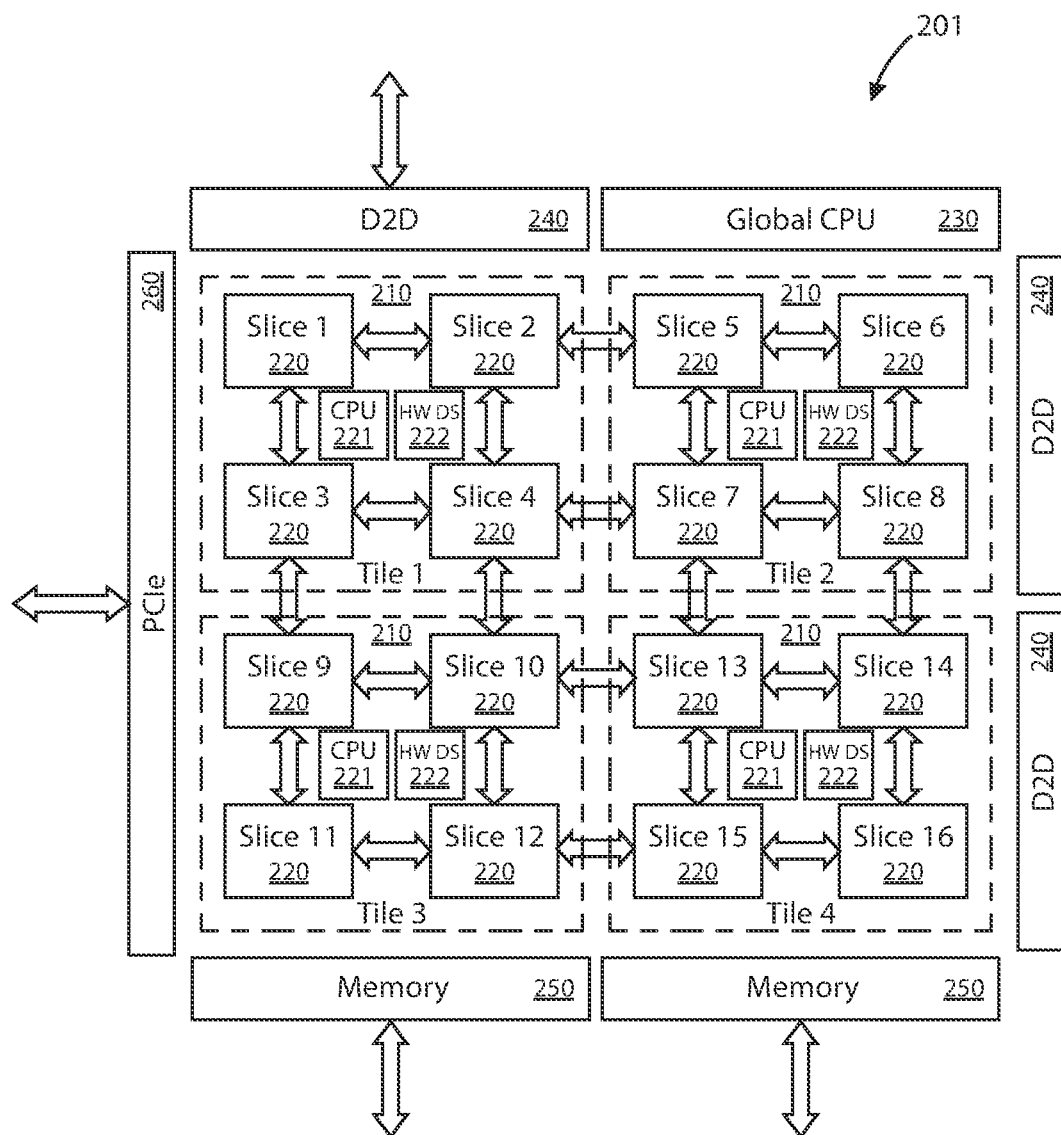
FIGS. 2A-2B are simplified block diagrams illustrating 16-slice chiplet devices according to examples of the present invention.

FIG. 2A is a simplified block diagram illustrating an example configuration of a 16-slice chiplet device 201. In this case, the chiplet 201 includes four tile devices 210, each of which includes four slice devices 220, a CPU 221, and a hardware dispatch (HW DS) device 222. In a specific example, these tiles 210 are arranged in a symmetrical manner. As discussed previously, the CPU 221 of a tile 210 can coordinate the operations performed by all slices within the tile. The HW DS 222 is coupled to the CPU 221 and can be configured to coordinate control of the slices 220 in the tile 210 (e.g., to determine which slice in the tile processes a target portion of transformer computations). In a specific example, the CPU 221 can be a reduced instruction set computer (RISC) CPU, or the like. Further, the CPU 221 can be coupled to a dispatch engine, which is configured to coordinate control of the CPU 221 (e.g., to determine which portions of transformer computations are processed by the particular CPU).

The CPUs 221 of each tile 210 can be coupled to a global CPU via a global CPU interface 230 (e.g., buses, connectors, sockets, etc.). This global CPU can be configured to coordinate the processing of all chiplet devices in an AI accelerator apparatus, such as apparatuses 101 and 102 of FIGS. 1A and 1B, respectively. In an example, a global CPU can use the HW DS 222 of each tile to direct each associated CPU 221 to perform various portions of the transformer computations across the slices in the tile. Also, the global CPU can be a RISC processor, or the like. The chiplet 201 also includes D2D interconnects 240 and a memory interface 250, both of which are coupled to each of the CPUs 221 in each of the tiles. In an example, the D2D interconnects can be configured with single-ended signaling. The memory interface 250 can include one or more memory buses coupled to one or more memory devices (e.g., DRAM, SRAM, SDRAM, or the like).

Further, the chiplet 201 includes a PCIe interface/bus 260 coupled to each of the CPUs 221 in each of the tiles. The PCIe interface 260 can be configured to communicate with a server or other communication system. In the case of a plurality of chiplet devices, a main bus device is coupled to the PCIe bus 260 of each chiplet device using a master chiplet device (e.g., main bus device also coupled to the master chiplet device). This master chiplet device is coupled to each other chiplet device using at least the D2D interconnects 240. The master chiplet device and the main bus device can be configured overlying a substrate member (e.g., same substrate as chiplets or separate substrate). An apparatus integrating one or more chiplets can also be coupled to a power source (e.g., configured on-chip, configured in a system, or coupled externally) and can be configured and operable to a server, network switch, or host system using the main bus device. The server apparatus can also be one of a plurality of server apparatuses configured for a server farm within a data center, or other similar configuration.

In a specific example, an AI accelerator apparatus configured for GPT-3 can incorporate eight chiplets (similar to apparatus 102 of FIG. 1B). The chiplets can be configured with D2D 16×16 Gb/s interconnects, 32-bit LPDDR5 6.4 Gb/s memory modules, and 16 lane PCIe Gen 5 PHY NRZ 32 Gb/s/lane interface. LPDDR5 (16×16 GB) can provide the necessary capacity, bandwidth and low power for large scale NLP models, such as quantized GPT-3. Of course, there can be other variations, modifications, and alternatives.

Figure 2B:
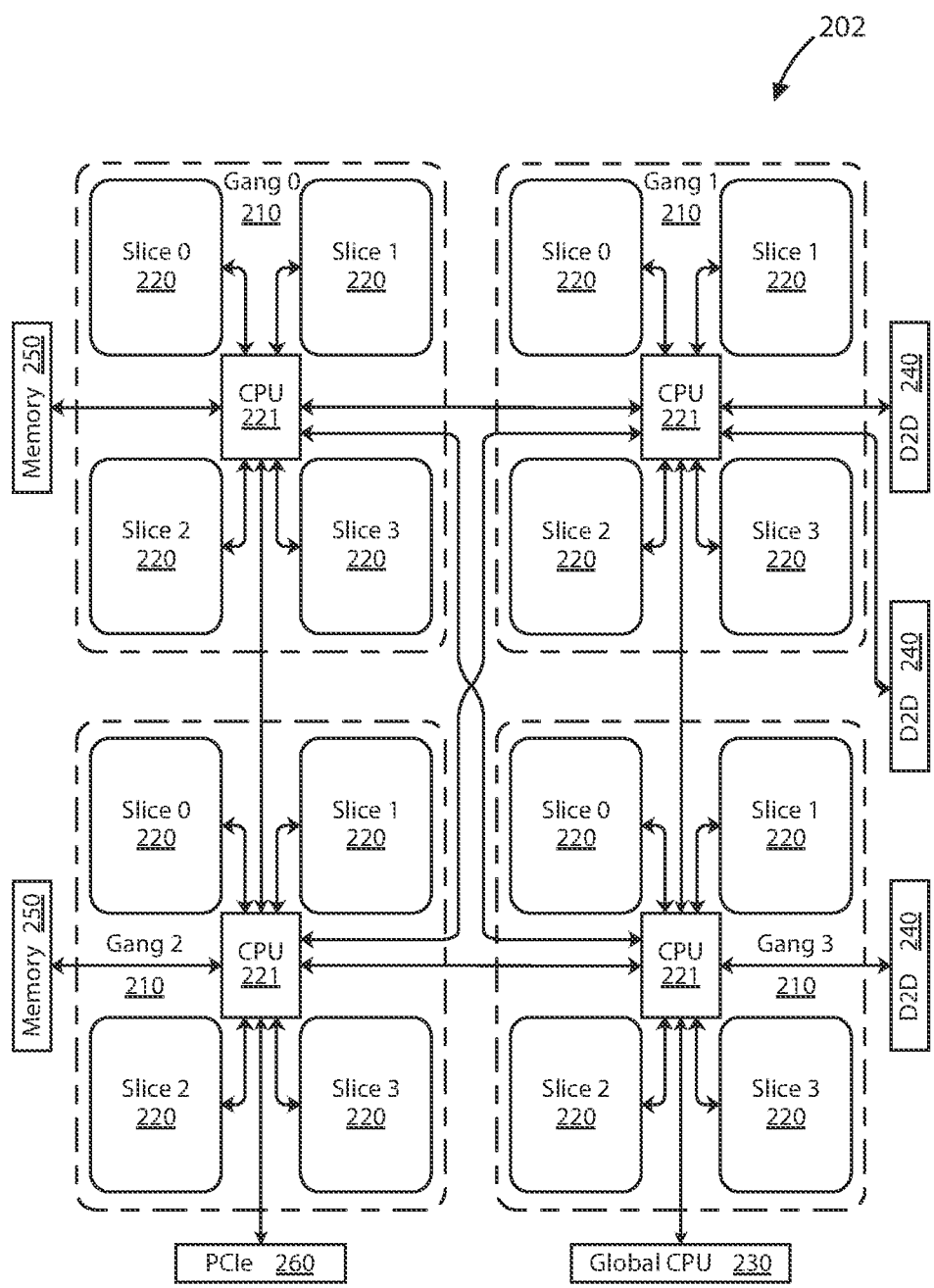

FIG. 2B is a simplified block diagram illustrating an example configuration of a 16-slice chiplet device 202. Similar to chiplet 201, chiplet 202 includes four gangs 210 (or tiles), each of which includes four slice devices 220 and a CPU 221. As shown, the CPU 221 of each gang/tile 210 is coupled to each of the slices 220 and to each other CPU 221 of the other gangs/tiles 210. In an example, the tiles/gangs serve as neural cores, and the slices serve as compute cores. With this multi-core configuration, the chiplet device can be configured to take and run several computations in parallel. The CPUs 221 are also coupled to a global CPU interface 230, D2D interconnects 240, a memory interface 250, and a PCIe interface 260. As described for FIG. 2A, the global CPU interface 230 connects to a global CPU that controls all of the CPUs 221 of each gang 210.

Figure 3A:
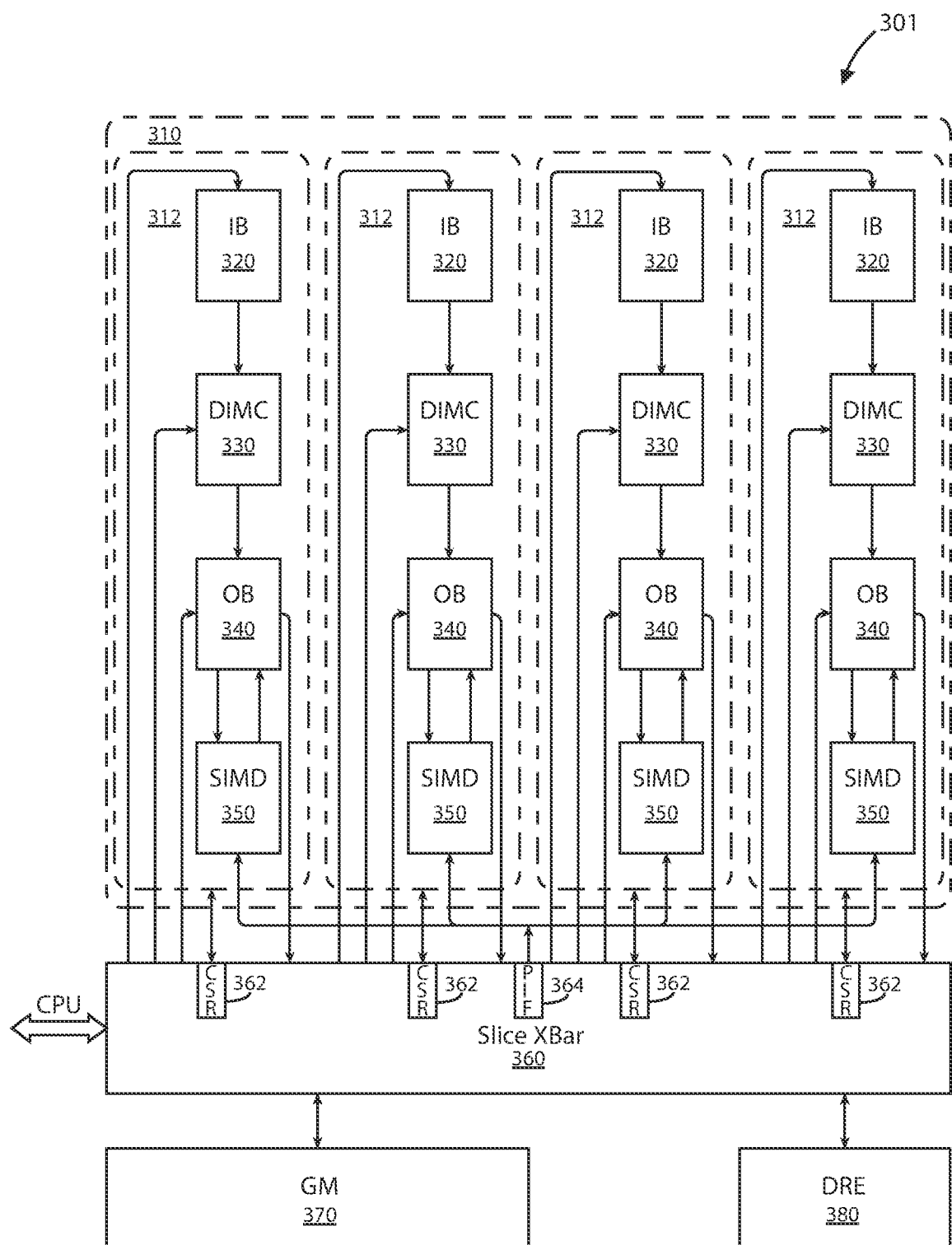
FIGS. 3A-B are simplified block diagrams illustrating slice devices according to examples of the present invention.

FIG. 3A is a simplified block diagram illustrating an example slice device 301 of a chiplet. For the 16-slice chiplet example, slice device 301 includes a compute core 310 having four compute paths 312, each of which includes an input buffer (IB) device 320, a digital in-memory-compute (DIMC) device 330, an output buffer (OB) device 340, and a Single Instruction, Multiple Data (SIMD) device 350 coupled together. Each of these paths 312 is coupled to a slice cross-bar/controller 360, which is controlled by the tile CPU to coordinate the computations performed by each path 312.

In an example, the DIMC is coupled to a clock and is configured within one or more portions of each of the plurality of slices of the chiplet to allow for high throughput of one or more matrix computations provided in the DIMC such that the high throughput is characterized by 512 multiply accumulates per a clock cycle. In a specific example, the clock coupled to the DIMC is a second clock derived from a first clock (e.g., chiplet clock generator, AI accelerator apparatus clock generator, etc.) configured to output a clock signal of about 0.5 GHz to 4 GHz; the second clock can be configured at an output rate of about one half of the rate of the first clock. The DIMC can also be configured to support a block structured sparsity (e.g., imposing structural constraints on weight patterns of a neural networks like a transformer).

In an example, the SIMD device 350 is a SIMD processor coupled to an output of the DIMC. The SIMD 350 can be configured to process one or more non-linear operations and one or more linear operations on a vector process. The SIMD 350 can be a programmable vector unit or the like. The SIMD 350 can also include one or more random-access memory (RAM) modules, such as a data RAM module, an instruction RAM module, and the like.

In an example, the slice controller 360 is coupled to all blocks of each compute path 312 and also includes a control/status register (CSR) 362 coupled to each compute path. The slice controller 360 is also coupled to a memory bank 370 and a data reshape engine (DRE) 380. The slice controller 360 can be configured to feed data from the memory bank 370 to the blocks in each of the compute paths 312 and to coordinate these compute paths 312 by a processor interface (PIF) 364. In a specific example, the PIF 364 is coupled to the SIMD 350 of each compute path 312.

Figure 3B:
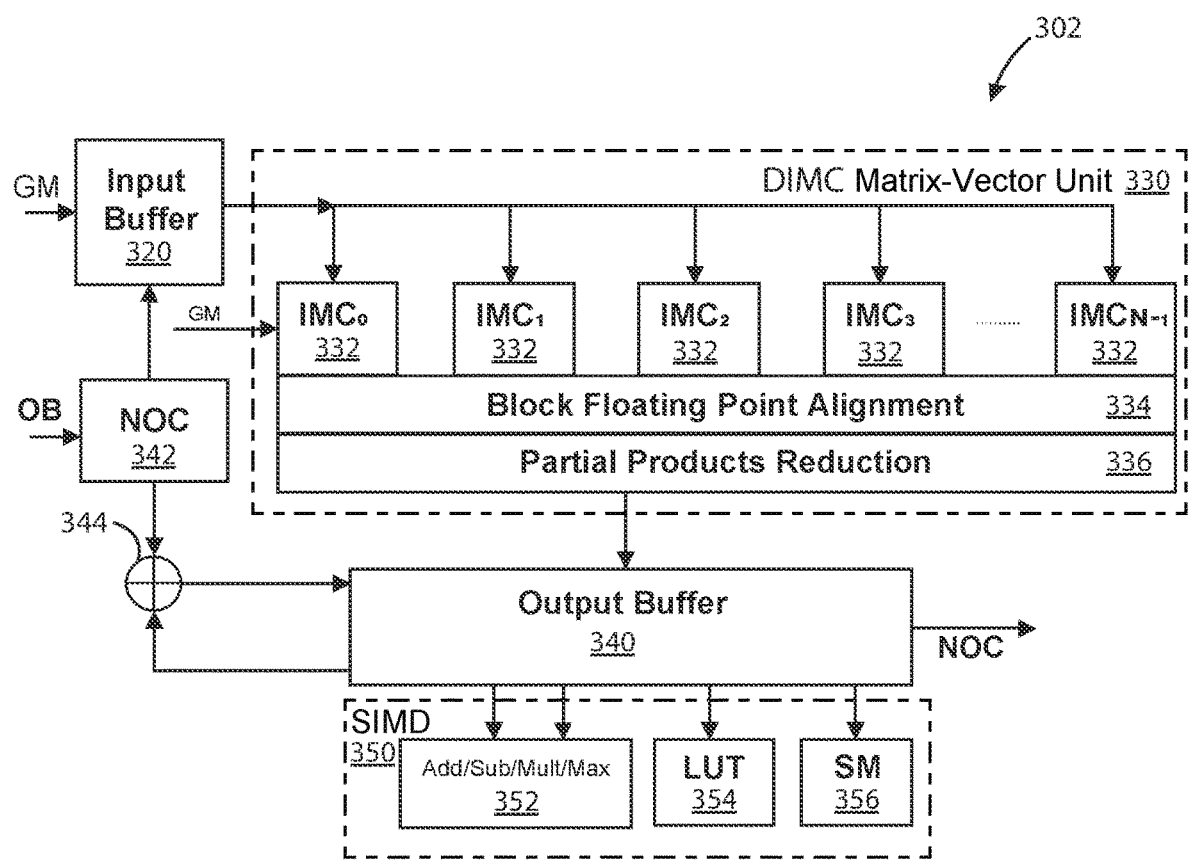

Further details for the compute core 310 are shown in FIG. 3B. The simplified block diagram of slice device 302 includes an input buffer 320, a DIMC matrix vector unit 330, an output buffer 340, a network on chip (NoC) device 342, and a SIMD vector unit 350. The DIMC unit 330 includes a plurality of in-memory-compute (IMC) modules 332 configured to compute a Scaled Dot-Product Attention function on input data to determine a probability distribution, which requires high-throughput matrix multiply-accumulate operations.

These IMC modules 332 can also be coupled to a block floating point alignment module 334 and a partial products reduction module 336 for further processing before outputting the DIMC results to the output buffer 540. In an example, the input buffer 320 receives input data (e.g., data vectors) from the memory bank 370 (shown in FIG. 3A) and sends the data to the IMC modules 332. The IMC modules 332 can also receive instructions from the memory bank 370 as well.

In addition to the details discussed previously, the SIMD 350 can be configured as an element-wise vector unit. The SIMD 350 can includes a computation unit 352 (e.g., add, subtract, multiply, max, etc.), a look-up table (LUT) 354, and a state machine (SM) module 356 configured to receive one or more outputs from the output buffer 340.

The NoC device 342 is coupled to the output buffer 340 configured in a feedforward loop via shortcut connection 344. Also, the NoC device 342 is coupled to each of the slices and is configured for multicast and unicast processes. More particularly, the NoC device 342 can be configured to connect all of the slices and all of the tiles, multi-cast input activations to all of the slices/tiles, and collect the partial computations to be unicast for a specially distributed accumulation.

Considering the previous eight-chiplet AI accelerator apparatus example, the input buffer can have a capacity of 64 KB with 16 banks and the output buffer can have a capacity of 128 KB with 16 banks. The DIMC can be an 8-bit block have dimensions 64×64 (eight 64×64 IMC modules) and the NoC can have a size of 512 bits. The computation block in the SIMD can be configured for 8-bit and 32-bit integer (int) and unsigned integer (uint) computations. These slice components can vary depending on which transformer the AI accelerator apparatus will serve.

Figure 4:
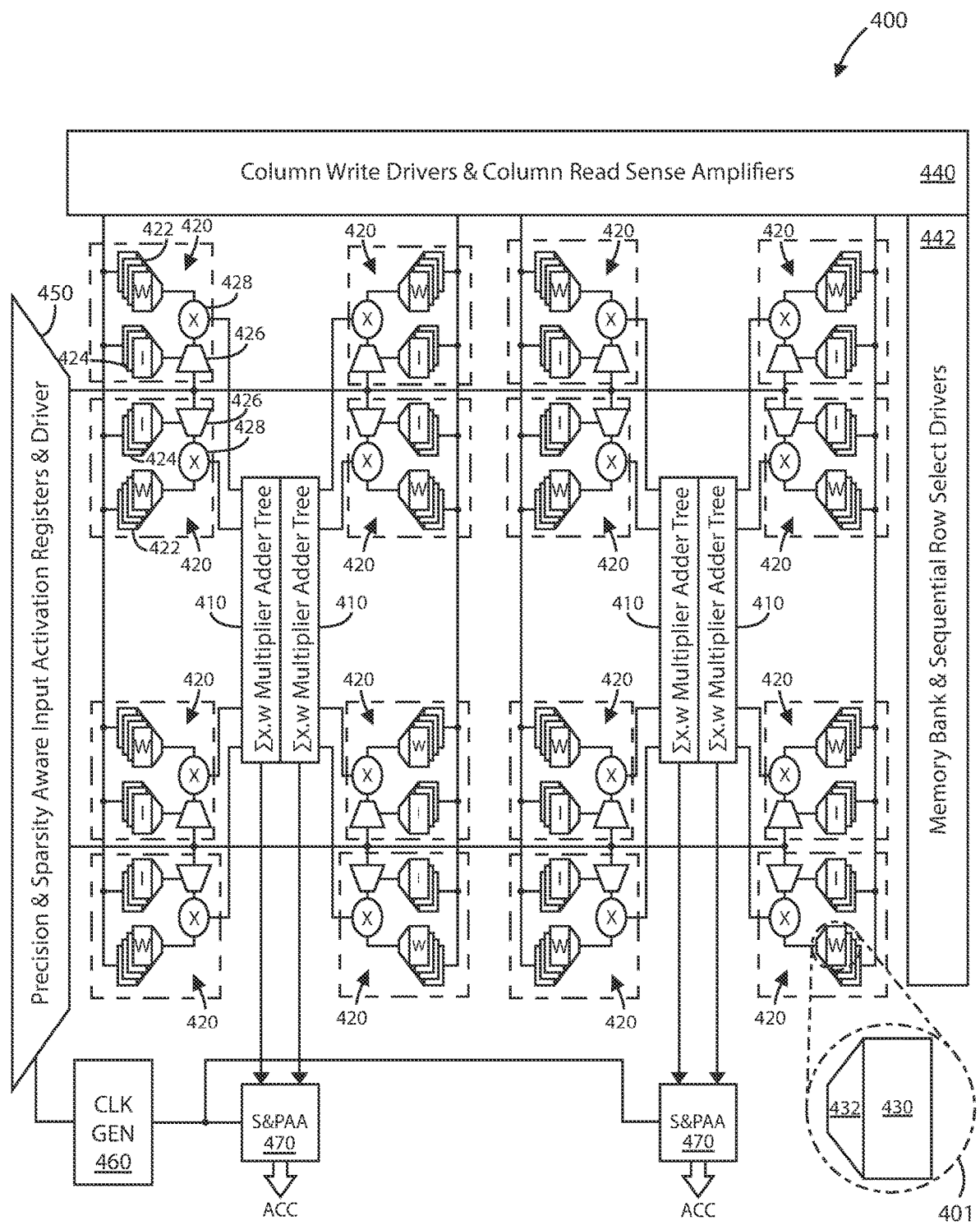
FIG. 4 is a simplified block diagram illustrating an in-memory-compute (IMC) module according to an example of the present invention.

FIG. 4 is a simplified block diagram illustrating an example IMC module 700. As shown, module 700 includes one or more computation tree blocks 410 that are configured to perform desired computations on input data from one or more read-write blocks 420. Each of these read-write blocks 420 includes one or more first memory-select units 422 (also denoted as "W"), one or more second memory-select units 424 (also denoted as "I"), an activation multiplexer 426, and an operator unit 428. The first memory-select unit 422 provides an input to the operator unit 428, while the second memory-select unit 424 controls the activation multiplexer 426 that is also coupled to the operator unit 428. In the case of multiply-accumulate operations, the operator unit 428 is a multiplier unit and the computation tree blocks 410 are multiplier adder tree blocks (i.e., $\Sigma x \cdot w$).

As shown in close-up 401, each of the memory-select units 422, 424 includes a memory cell 430 (e.g., SRAM cell, or the like) and a select multiplexer 432. Each of the memory-select units 422, 424 is coupled to a read-write controller 440, which is also coupled to a memory bank/driver block 442. In an example, the read-write controller 440 can be configured with column write drivers and column read sense amplifiers, while the memory bank/driver block 432 can configured with sequential row select drivers.

An input activation controller 450 can be coupled to the activation multiplexer 426 each of the read-write blocks 420. The input activation controller 450 can include precision and sparsity aware input activation register and drivers. The operator unit 428 receives the output of the first memory-select unit 422 and receives the output of this block 450 through the activation multiplexer 426, which is controlled by the output of the second memory-select unit 424. The output of the operator unit 428 is then fed into the computation tree block 410.

Figure 13B:
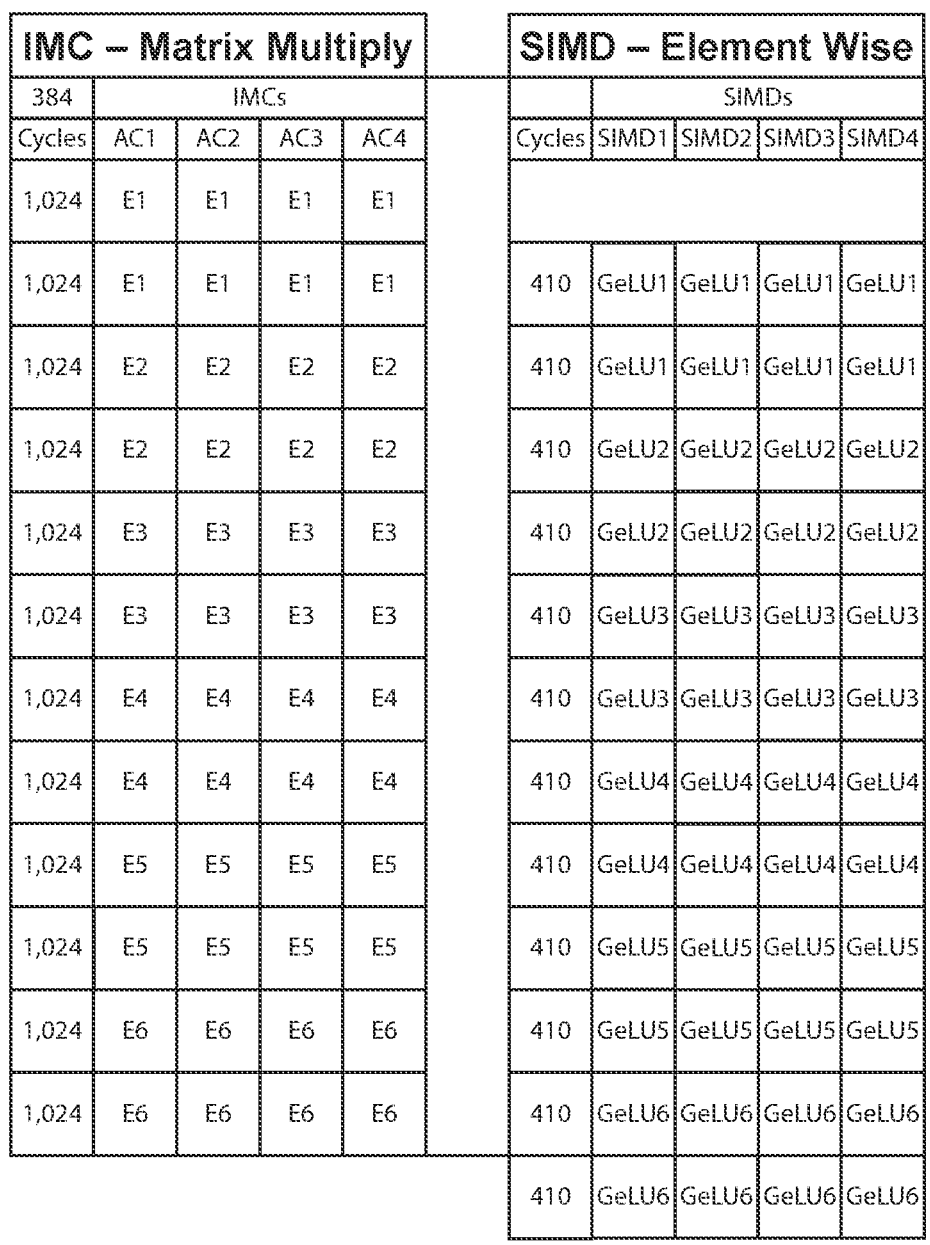
Figure 13C:

The input activation block 450 is also coupled to a clock source/generator 460. As discussed previously, the clock generator 460 can produce a second clock derived from a first clock configured to output a clock signal of about 0.5 GHz to 4 GHz; the second clock can be configured at an output rate of about one half of the rate of the first clock. The clock generator 460 is coupled to one or more sign and precision aware accumulators 470, which are configured to receive the output of the computation tree blocks 410. In an example, an accumulator 470 is configured to receive the outputs of two computation tree blocks 410. Example output readings of the IMC are shown in FIGS. 13A-13C.

Referring back to the eight-chiplet AI accelerator apparatus example, the memory cell can be a dual bank 2×6T SRAM cell, and the select multiplexer can be an 8T bank select multiplexer. In this case, the memory bank/driver block 442 includes a dual-bank SRAM bank. Also, the read/write controller can include 64 bytes of write drivers and 64 bytes of read sense amplifiers. Those of ordinary skill in the art will recognize other variations, modifications, and alternatives to these IMC module components and their configurations.

Figure 5A:
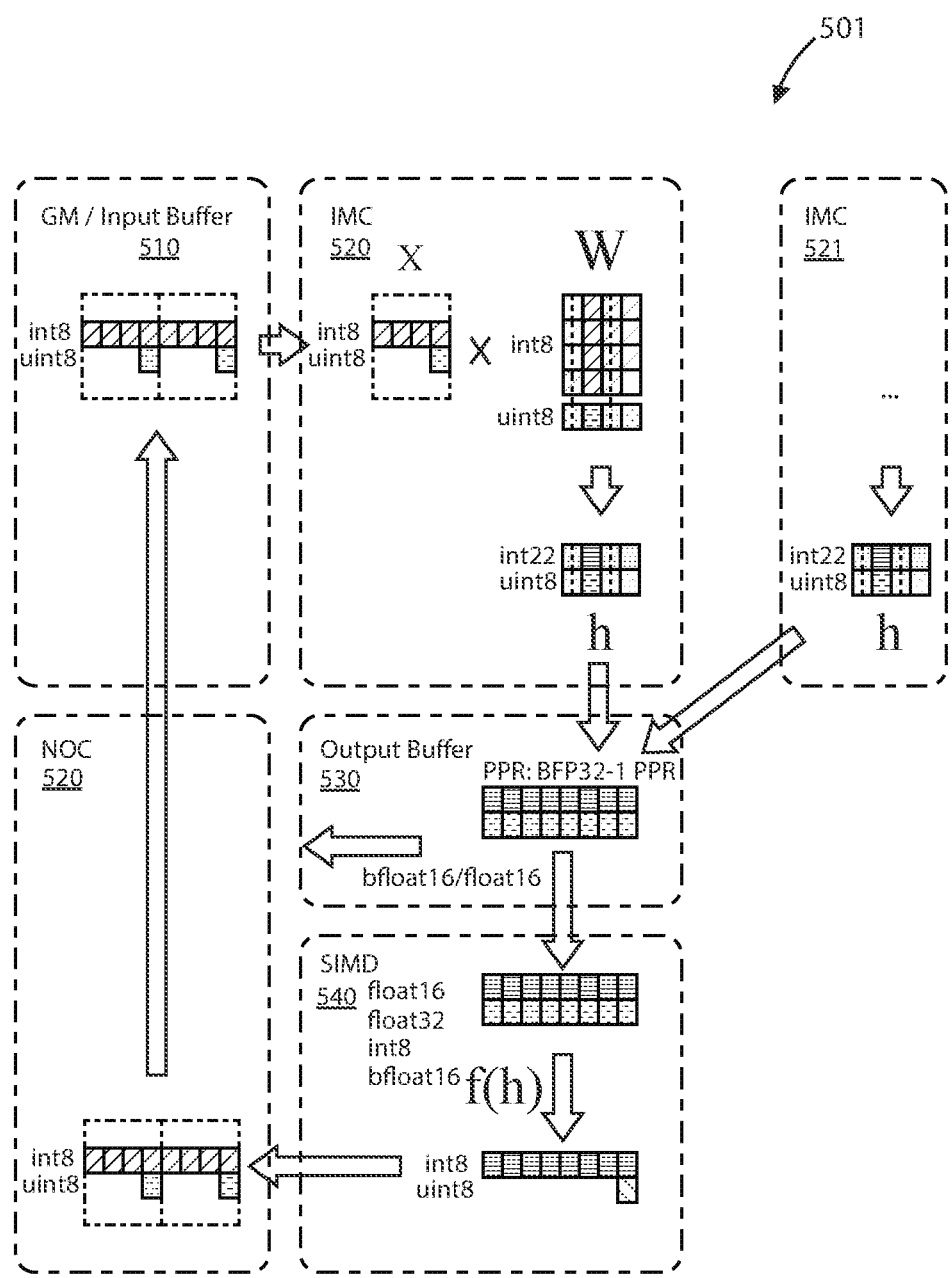
FIG. 5A is a simplified block flow diagram illustrating numerical formats of the data being processed in a slice device according to an example of the present invention.

FIG. 5A is a simplified block flow diagram illustrating example numerical formats of the data being processed in a slice. Diagram 501 shows a loop with the data formats for the GM/input buffer 510, the IMC 520, the output buffer 530, the SIMD 540, and the NoC 550, which feeds back to the GM/input buffer 510. The IMC block 520 shows the multiply-accumulate operation ($\Sigma x \cdot w$). Additionally, the format for the data from IMC 532 flows to the output buffer 530 as well. In this example, the numerical formats include integer (int), floating point (float), and block floating (bfloat) of varying lengths.

Figure 5B:
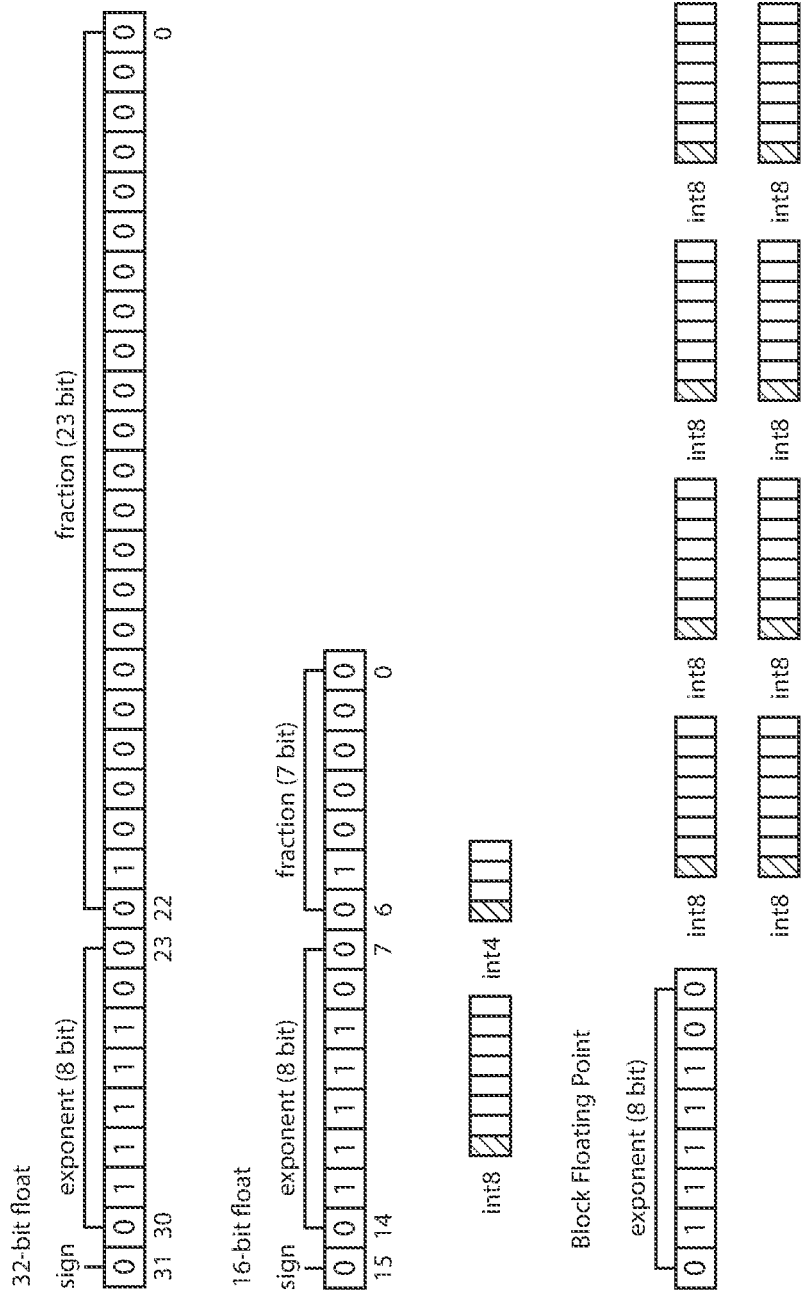
FIG. 5B is a simplified diagram illustrating example numerical formats.

FIG. 5B is a simplified diagram illustrating certain numerical formats, including certain formats shown in FIG. 5A. Block floating point numerics can be used to address certain barriers to performance. Training of transformers is generally done in floating point, i.e., 32-bit float or 16-bit float, and inference is generally done in 8-bit integer ("int8"). With block floating point, an exponent is shared across a set of mantissa significant values (see diagonally line filled blocks of the int8 vectors at the bottom of FIG. 5B), as opposed to floating point where each mantissa has a separate exponent (see 32-bit float and 16-bit float formats at the top of FIG. 5A). The method of using block floating point numerical formats for training can exhibit the efficiency of fixed point without the problems of integer arithmetic, and can also allow for use of a smaller mantissa, e.g., 4-bit integer ("int4") while retaining accuracy. Further, by using the block floating point format (e.g., for activation, weights, etc.) and sparsity, the inference of the training models can be accelerated for better performance. Those of ordinary skill in the art will recognize other variations, modifications, and alternatives to these numerical formats used to process transformer workloads.

Figure 6:
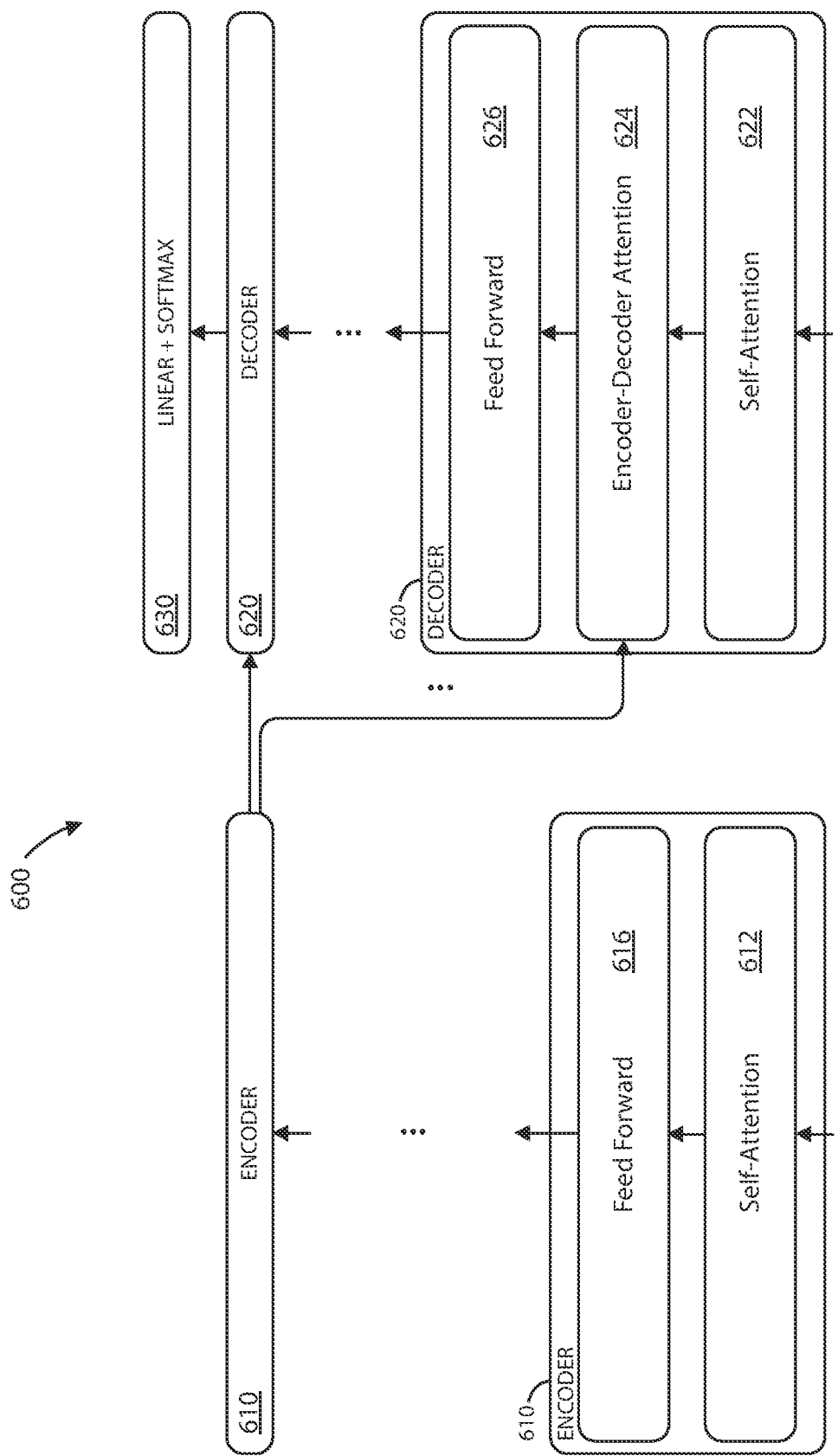
FIG. 6 is a simplified block diagram of a transformer architecture.

FIG. 6 illustrates a simplified transformer architecture 600. The typical transformer can be described as having an encoder stack configured with a decoder stack, and each such stack can have one or more layers. Within the encoder layers 610, a self-attention layer 612 determines contextual information while encoding input data and feeds the encoded data to a feed-forward neural network 616. The encoder layers 610 process an input sequence from bottom to top, transforming the output into a set of attention vectors K and V. The decoder layers 620 also include a corresponding self-attention layer 622 and feed-forward neural network 626, and can further include an encoder-decoder attention layer 624 uses the attention vectors from the encoder stack that aid the decoder in further contextual processing. The decoder stack outputs a vector of floating points (as discussed for FIG. 5B), which is fed to linear and softmax layers 630 to project the output into a final desired result (e.g., desired word prediction, interpretation, or translation). The linear layer is a fully-connected neural network that projects the decoder output vector into a larger vector (i.e., logits vector) that contains scores associated with all potential results (e.g., all potential words), and the softmax layer turns these scores into probabilities. Based on the this probability output, the projected word meaning may be chosen based on the highest probability or by other derived criteria depending on the application.

Transformer model variations include those based on just the decoder stack (e.g., transformer language models such as GPT-2, GPT-3, etc.) and those based on just the encoder stack (e.g., masked language models such as BERT, BERT Large, etc.). Transformers are based on four parameters: sequence length (S) (i.e., number of tokens), number of attention heads (A), number of layers (L), and embedding length (H). Variations of these parameters are used to build practically all transformer-based models today. Embodiments of the present invention can be configured for any similar model types.

A transformer starts as untrained and is pre-trained by exposure to a desired data set for a desired learning application. Transformer-based language models are exposed to large volumes of text (e.g., Wikipedia) to train language processing functions such as predicting the next word in a text sequence, translating the text to another language, etc. This training process involves converting the text (e.g., words or parts of words) into token IDs, evaluating the context of the tokens by a self-attention layer, and predicting the result by a feed forward neural network.

Figure 7:
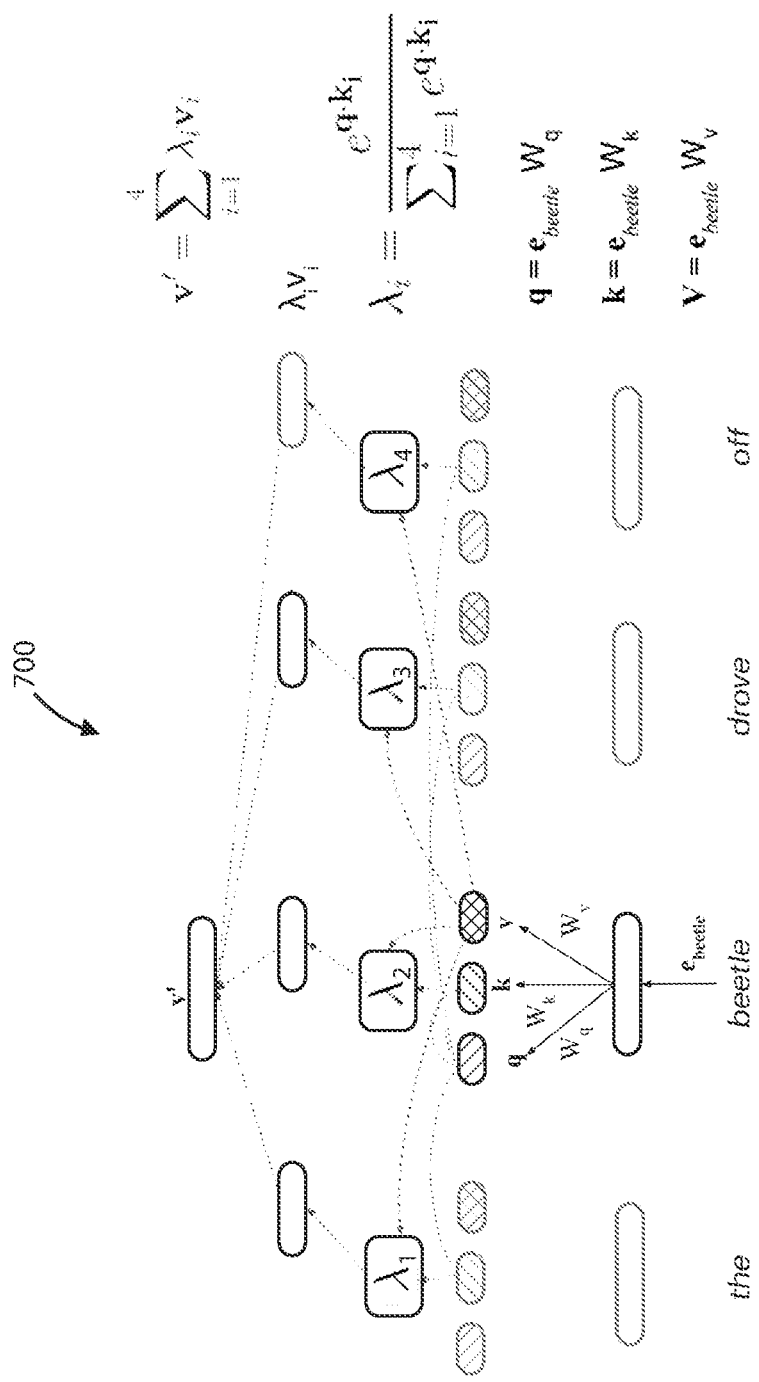
FIG. 7 is a simplified diagram illustrating a self-attention layer process for an example NLP model.

The self-attention process includes (1) determining query (Q), key (K), and value (V) vectors for the embedding of each word in an input sentence, (2) calculating a score for from the dot product of Q and K for each word of the input sentence against a target word, (3) dividing the scores by the square root of the dimension of K, (4) passing the result through a softmax operation to normalize the scores, (5) multiplying each V by the softmax score, and (6) summing up the weighted V vectors to produce the output. An example self-attention process 700 is shown in FIG. 7.

As shown, process 700 shows the evaluation of the sentence "the beetle drove off" at the bottom to determine the meaning of the word "beetle" (e.g., insect or automobile). The first step is to determine the $q_{beetle}$, $k_{beetle}$, and $v_{beetle}$ vectors for the embedding vector $e_{beetle}$. This is done by multiplying $e_{beetle}$ by three different pre-trained weight matrices $W_q$, $W_k$, and $W_v$. The second step is to calculate the dot products of $q_{beetle}$ with the K vector of each word in the sentence (i.e., $k_{the}$, $k_{beetle}$, $k_{drove}$, and $k_{off}$), shown by the arrows between $q_{beetle}$ and each K vector. The third step is to divide the scores by the square root of the dimension $d_k$, and the fourth step is to normalize the scores using a softmax function, resulting in $\lambda_i$. The fifth step is to multiply the V vectors by the softmax score ($\lambda_i v_i$) in preparation for the final step of summing up all the weight value vectors, shown by v' at the top.

Process 700 only shows the self-attention process for the word "beetle", but the self-attention process can be performed for each word in the sentence in parallel. The same steps apply for word prediction, interpretation, translation, and other inference tasks. Further details of the self-attention process in the BERT Large model are shown in FIGS. 8 and 9.

Figure 8:
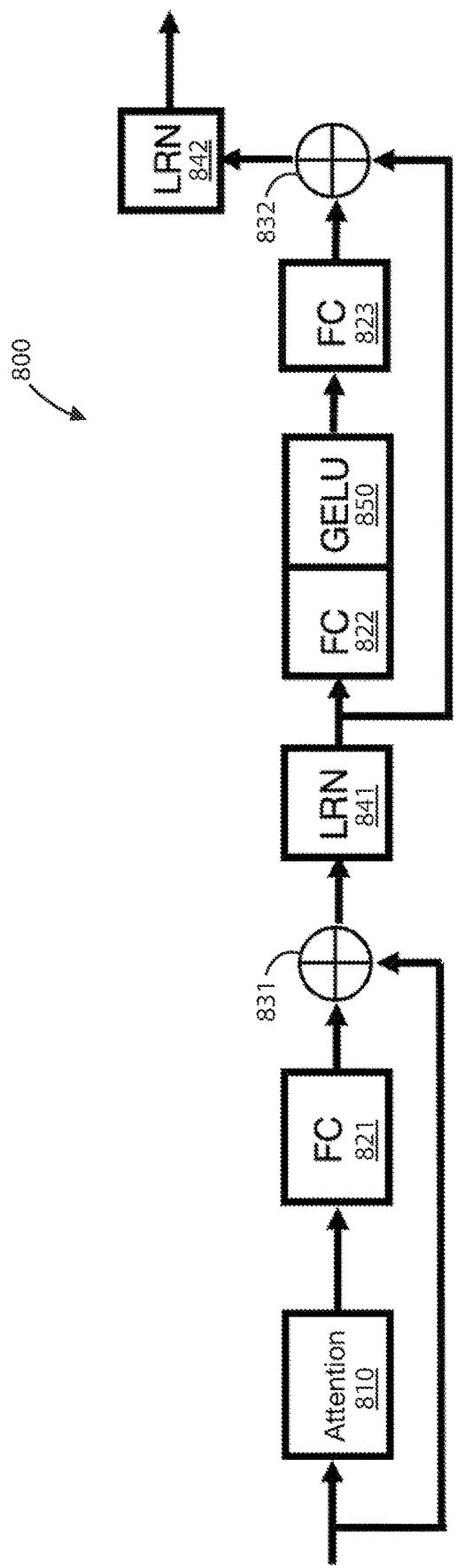
FIG. 8 is a simplified block diagram illustrating an example transformer.

A simplified block diagram of the BERT Large model (S=384, A=16, L=34, and H=1024) is shown in FIG. 8. This figure illustrates a single layer 800 of a BERT Large transformer, which includes an attention head device 810 configured with three different fully-connected (FC) matrices 821-823. As discussed previously, the attention head 810 receives embedding inputs (384×1024 for BERT Large) and measures the probability distribution to come up with a numerical value based on the context of the surrounding words. This is done by computing different combination of softmax around a particular input value and producing a value matrix output having the attention scores.

Figure 9:
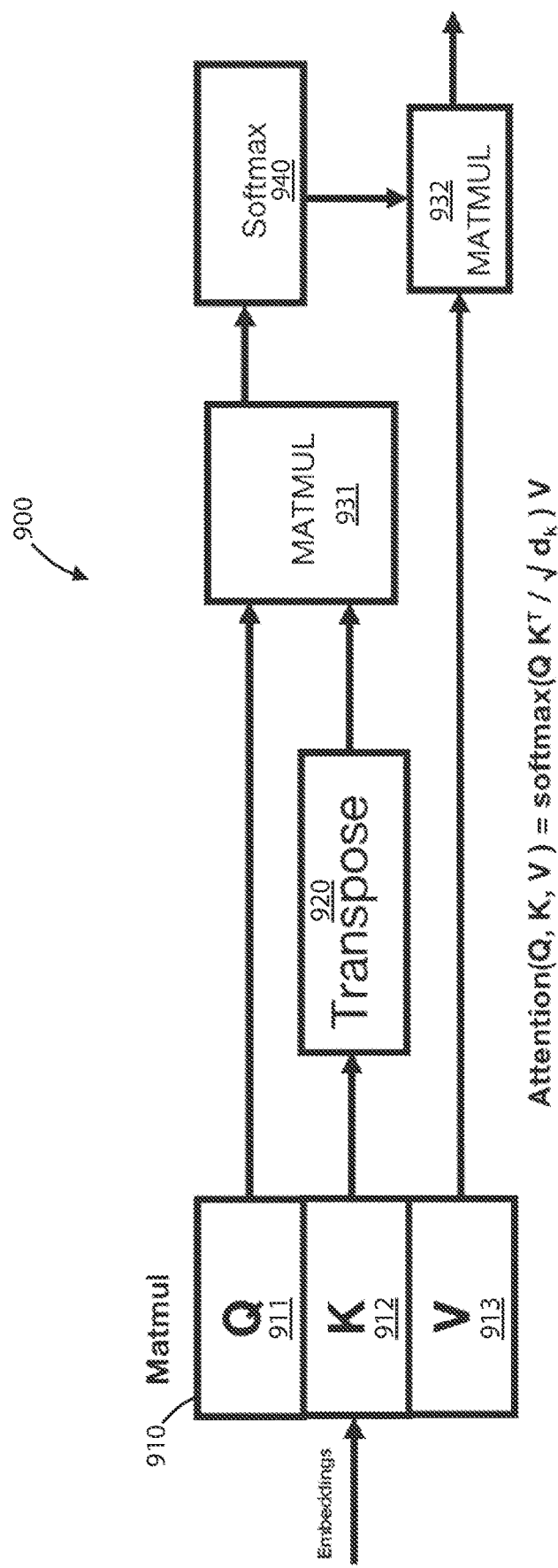
FIG. 9 is a simplified block diagram illustrating an attention head layer of an example transformer.

Further details of the attention head 810 are provided in FIG. 9. As shown, the attention head 900 computes a score according to an attention head function: Attention(Q, K, V)=softmax($QK^T/\sqrt{d_k}$)V. This function takes queries (Q), keys (K) of dimension $d_k$, and values (V) of dimension $d_k$ and computes the dot products of the query with all of the keys, divides the result by a scaling factor $\sqrt{d_k}$ and applies a softmax function to obtain the weights (i.e., probability distribution) on the values, as shown previously in FIG. 7.

The function is implemented by several matrix multipliers and function blocks. An input matrix multiplier 910 obtains the Q, K, and V vectors from the embeddings. The transpose function block 920 computes $K^T$, and a first matrix multiplier 931 computes the scaled dot product $QK^T/\sqrt{d_k}$. The softmax block 940 performs the softmax function on the output from the first matrix multiplier 931, and a second matrix multiplier 932 computes the dot product of the softmax result and V.

For BERT Large, 16 such independent attention heads run in parallel on 16 AI slices. These independent results are concatenated and projected once again to determine the final values. The multi-head attention approach can be used by transformers for (1) "encoder-decoder attention" layers that allow every position in the decoder to attend over all positions of the input sequence, (2) self-attention layers that allows each position in the encoder to attend to all positions in the previous encoder layer, and (3) self-attention layers that allow each position in the decoder to attend to all positions in the decoder up to and including that position. Of course, there can be variations, modifications, and alternatives in other transformer.

Returning to FIG. 8, the attention score output then goes to a first FC matrix layer 821, which is configured to process the outputs of all of the attention heads. The first FC matrix output goes to a first local response normalization (LRN) block 841 through a short-cut connection 830 that also receives the embedding inputs. The first LRN block output goes to a second FC matrix 822 and a third FC matrix 823 with a Gaussian Error Linear Unit (GELU) activation block 850 configured in between. The third FC matrix output goes to a second LRN block 842 through a second short-cut connection 832, which also receives the output of the first LRN block 841.

Using a transformer like BERT Large, NLP requires very high compute (e.g., five orders of magnitude higher than CV). For example, BERT Large requires 5.6 giga-multiply-accumulate operations per second ("GMACs") per transformer layer. Thus, the NLP inference challenge is to deliver this performance at the lowest energy consumption.

Although the present invention is discussed in the context of a BERT Large transformer for NLP applications, those of ordinary skill in the art will recognize variations, modifications, and alternatives. The particular embodiments shown can also be adapted to other transformer-based models and other AI/machine learning applications.

Many things impact the performance of such transformer architectures. The softmax function tends to be the critical path of the transformer layers (and has been difficult to accelerate in hardware). Requirements for overlapping the compute, SIMD operations and NoC transfers also impacts performance. Further, efficiency of NoC, SIMD, and memory bandwidth utilization is important as well.

Different techniques can be applied in conjunction with the AI accelerator apparatus and chiplet device examples to improve performance, such as quantization, sparsity, knowledge distillation, efficient tokenization, and software optimizations. Supporting variable sequence length (i.e., not requiring padding to the highest sequence lengths) can also reduce memory requirements. Other techniques can include optimizations of how to split self-attention among slices and chips, moving layers and tensors between the slices and chips, and data movement between layers and FC matrices.

According to an example, the present invention provides for an AI accelerator apparatus (such as shown in FIGS. 1A and 1B) coupled to an aggregate of transformer devices (e.g., BERT, BERT Large, GPT-2, GPT-3, or the like). In a specific example, this aggregate of transformer devices can include a plurality of transformers configured in a stack ranging from three to N layers, where N is an integer up to 128.

In an example, each of the transformers is configured within one or more DIMCs such that each of the transformers comprises a plurality of matrix multipliers including QKV matrices configured for an attention layer of a transformer followed by three fully-connected matrices (FC). In this configuration, the DIMC is configured to accelerate the transformer and further comprises a dot product of Q $K^T$ followed by a softmax (Q $K^T$/square root $(d_k)$)V. In an example, the AI accelerator apparatus is also includes a SIMD device (as shown in FIGS. 3A and 3B) configured to accelerate a computing process of the softmax function.

According to an example, the present invention provides for methods of compiling the data representations related to transformer-based models mapping them to an AI accelerator apparatus in a spatial array. These methods can use the previously discussed numerical formats as well as sparsity patterns. Using a compile algorithm, the data can be configured to a dependency graph, which the global CPU can use to map the data to the tiles and slices of the chiplets. Example mapping methods are shown in FIGS. 10-13B.

Figure 10:
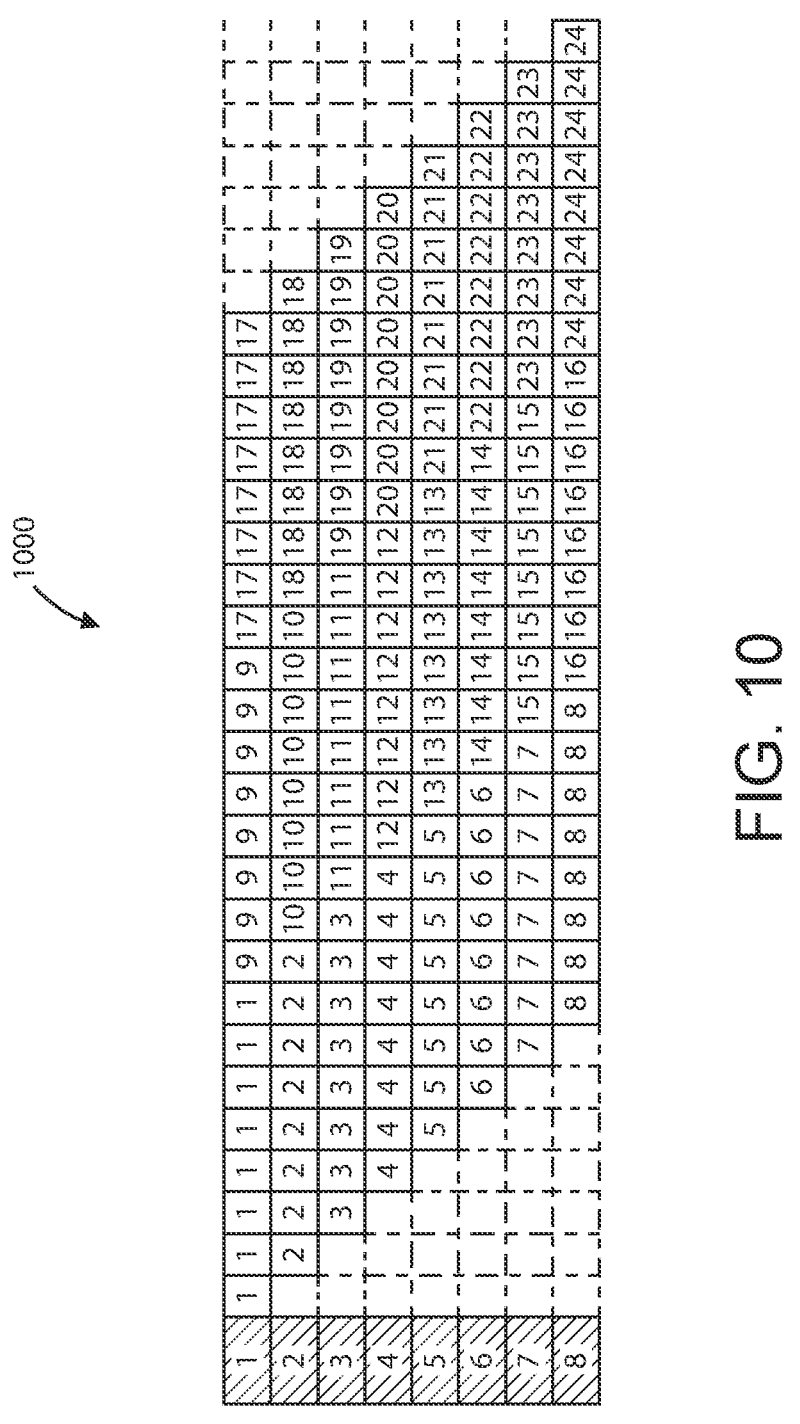

FIG. 10 is a simplified table representing an example mapping process between a 24-layer transformer and an example eight-chiplet AI accelerator apparatus. As shown, the chiplets are denoted by the row numbers on the left end and the model layers mapped over time are denoted by the table entry numbers. In this case, the 24 layers of the transformer (e.g., BERT Large) are mapped to the chiplets sequentially in a staggered manner (i.e., first layer mapped onto the first chiplet, the second layer mapped onto the second chiplet one cycle after the first, the third layer mapped onto the third chiplet two cycles after the first, etc.) After eight cycles, the mapping process loops back to the first chiplet to start mapping the next eight model layers.

Figure 11:
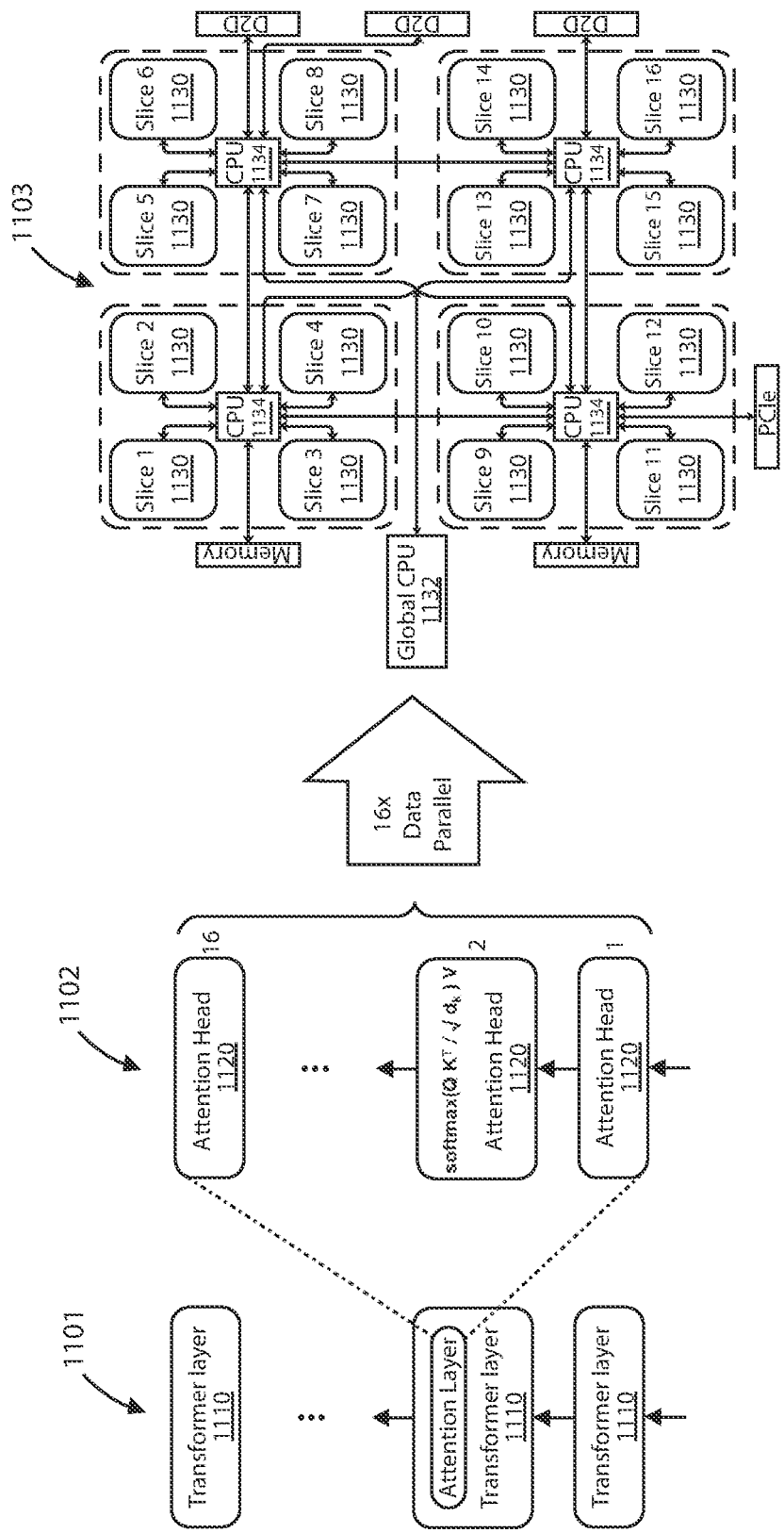
FIG. 11 is a simplified block flow diagram illustrating a mapping process between a transformer and an AI accelerator apparatus according to an example of the present invention.

FIG. 11 is a simplified block flow diagram illustrating a mapping process between a transformer and an example AI accelerator apparatus. As shown, a transformer 1101 includes a plurality of transformer layers 1110, each having an attention layer 1102. In this case, there are 16 attention heads 1110 (e.g., BERT Large) computing the attention function as discussed previously. These 16 attention heads are mapped to 16 slices 1130 of an AI accelerator apparatus 1103 (similar to apparatuses 201 and 202) via global CPU 1132 communicating to the slice CPUs 1134.

Figure 12:
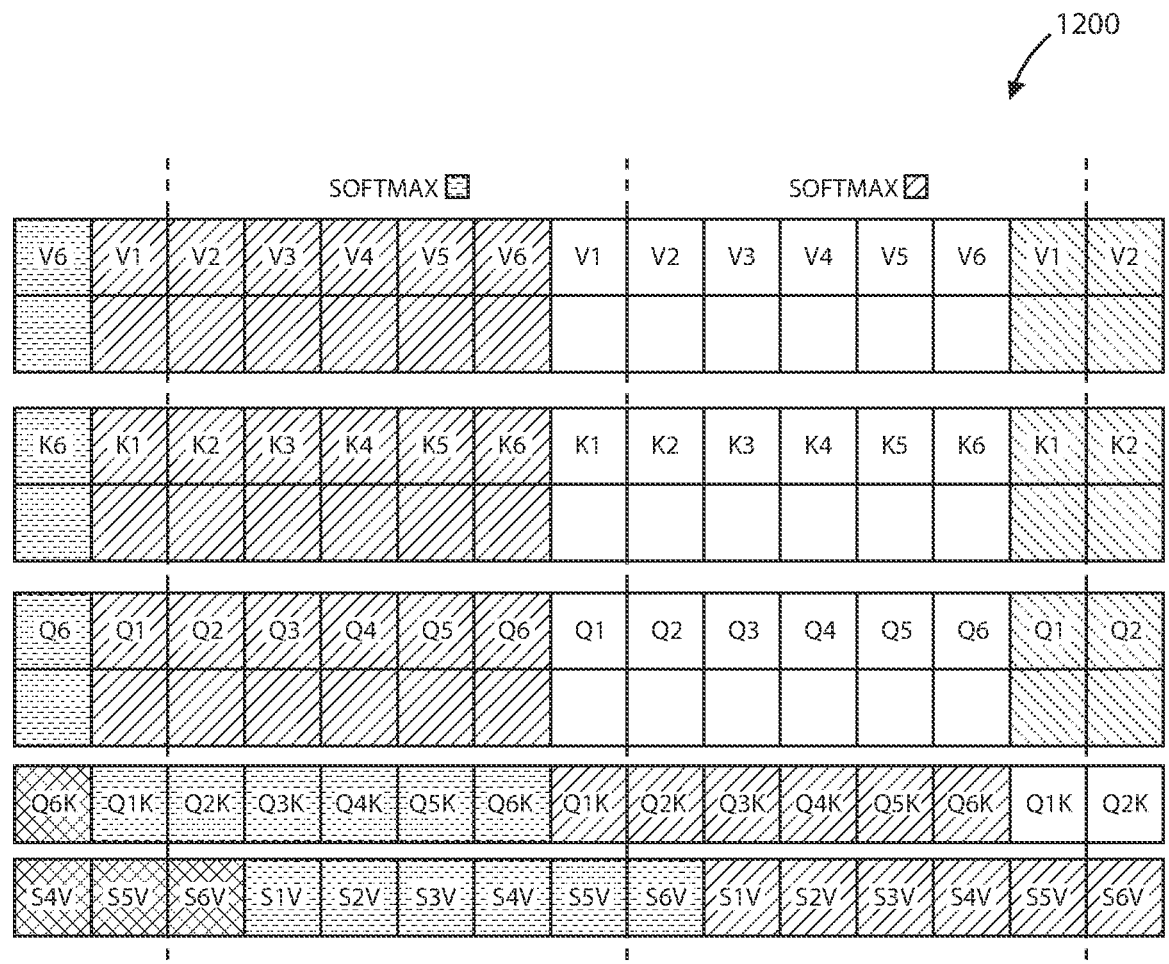
FIG. 12 is a simplified table representing a tiling attention process of a transformer to an AI accelerator apparatus according to an example of the present invention.

FIG. 12 is a simplified table representing an example tiling attention process between a transformer and an example AI accelerator apparatus. Table 1200 shows positions of Q, K, and V vectors and the timing of the softmax performed on these vectors. The different instances of the softmax are distinguished by fill pattern (e.g., diagonal line filled blocks representing Q, K, V vectors and diagonal line filled blocks representing Q-K and Softmax-V dot products).

In an example, the embedding E is a [64L, 1024] matrix (L=6 for sentence length of 384), and $E_i$ is a [64, 1024] submatrix of E, which is determined as $E_i = E_{(64i-63):(64i), 1:1024}$, where i=1 ... L. Each of the K and Q matrices can be allocated to two slices (e.g., @[SL1:AC3,4]: $K_i \leftarrow E_i \times K_{1 \ldots 1024, 1 \ldots 64}$; and @[SL1:AC1,2]: $Q_i \leftarrow E_i \times Q_{1 \ldots 1024, 1 \ldots 64}$). An example data flows through IMC and SIMD modules are shown in the simplified tables of FIGS. 13A-13C.

FIG. 13A shows table 1301 representing mapping self-attention to an AI slice according to an example of the present invention. The left side shows the IMC cycles for matrix multiplications performed by IMC modules AC1-AC4, while the right side shows SIMD cycles for element-wise computations performed by SIMD modules SIMD1-SIMD4. In this example, the IMC modules determine the key vectors K1-K6 (a[64×512]; w[512×64]; o[64×64]), and query vectors Q1-Q6 (a[64×512]; w[512×64]; o[64×64]), followed by the transpose QKT1-QKT6 (a[64×64]; w[64×384]; o[64×384]). Then, the SIMD modules compute the softmax Smax1-Smax6 (a[64×384]). Meanwhile, the IMC modules determine the value vectors V1-V6 (a[64×512]; w[512×64]; o[64×64]), followed by the multiplication of the value vectors and the softmax results.

FIG. 13B shows table 1302 representing mapping dense embedding vectors and the second FC matrix to an AI slice (left: IMCs; right: SIMDs) according to an example of the present invention. In this example, the IMCs process the embedding vectors E1-E6 (a[64×512]; w[512×64]; o[64×64]), which corresponds to the path from the attention head 810 to the second FC matrix 822 in FIG. 8. Following the processing of each embedding vector E, the SIMDs process the GELU (a[64×64]), which corresponds to the path through the first LRN block 841 and the GELU block 850 in FIG. 8.

FIG. 13C shows table 1303 representing mapping the third FC matrix to an AI slice (left: IMCs; right: SIMDs) according to an example of the present invention. In this example, the IMCs process the results through the second FC matrix, which corresponds to the path through the third FC matrix 823 and the second LRN block 842 in FIG. 8. Those of ordinary skill in the art will recognize other variations, modifications, and alternatives to the mappings shown in FIGS. 10-13C.

Although previous examples are discussed in the context of NLP, those of ordinary skill in the art will recognize variations, modifications, and alternatives to these methods and devices for other machine learning applications, such as those using generative AI. Embodiments of the present invention can be configured to process workloads involving text, audio files, videos, and images for a variety of applications, such as location services (e.g., map view generation), search engine optimization (e.g., text-to-image translations), and computer-generated multimedia (e.g., face synthesis and voice cloning), and more.

In an example, the previously discussed AI accelerator apparatus and chiplet devices can be configured to process transformer-based generative models and discriminative models. The generative model is configured to use a reference data set to generate a new data set according to a generative algorithm. The reference data set can be determined using a data scraping process, a predetermined data library, or the like. The discriminative model is configured to compare samples from one or more data sets against predetermined criteria. These models can be used together to train the other model. The discriminative model can compare samples from the generated data set to a reference data set according to desired criteria to train the generative model, while the generative model can identify the samples of the generated data set to train the discriminative model.

The workloads involved in training these models can be performed using an AI accelerator apparatus or chiplet device, such as those discussed previously. More specifically, the compute units (e.g., DIMC devices) of the slice devices can be configured to accelerate one or more matrix computations for a generative AI application. These matrix computations can include those related to the operation and training of generative models, discriminative models, and the like. Further, all methods and configurations discussed previously can be incorporated into embodiments of a generative AI accelerator apparatus or chiplet device configured for generative AI applications.

While the above is a full description of the specific embodiments, various modifications, alternative constructions and equivalents may be used. As an example, the AI accelerator apparatus and chiplet devices can include any combination of elements described above, as well as outside of the present specification. Therefore, the above description and illustrations should not be taken as limiting the scope of the present invention which is defined by the appended claims.

What is claimed is:

1. An AI accelerator apparatus configured with in-memory compute, the apparatus comprising:
   one or N chiplets, where N is an integer greater than 1, each of the chiplets comprising a plurality of tiles, and each of the tiles comprising:
   a plurality of slices,
   a central processing unit (CPU) coupled to the plurality of slices, and
   a hardware dispatch device coupled to the CPU;
   a first clock configured to output a clock signal ranging from 0.5 GHz to 4 GHz;
   a plurality of die-to-die (D2D) interconnects coupled to the each of CPUs in each of the tiles;
   a peripheral component interconnect express (PCIe) bus coupled to the CPUs in each of the tiles;
   a dynamic random access memory (DRAM) interface coupled to the CPUs in each of the tiles;
   a global reduced instruction set computer (RISC) interface coupled to each of the CPUs in each of the tiles;
   wherein each of the slices includes a digital in memory compute (DIMC) device configured to allow for a throughput of one or more matrix computations provided in the DIMC device such that the throughput is characterized by 512 multiply accumulates per a clock cycle;
   wherein the DIMC device is configured to accelerate the one or more matrix computations for a generative AI application;
   wherein the DIMC device is coupled to a second clock configured at an output rate of one half of the rate of the first clock; and
   a substrate member configured to provide mechanical support and having a surface region and an interposer, the surface region being coupled to support the one or N chiplets, and the one or N chiplets being coupled to each other using the interposer.

2. The apparatus of claim 1 further comprising one or more double data rate (DDR) DRAM devices, the one or more DDR DRAM devices being coupled to one or more chiplets using the DRAM interface.

3. The apparatus of claim 1 further comprising a main bus device, the main bus device being coupled to each PCIe bus in each chiplet using a master chiplet device, the master chiplet device being coupled to each of the other chiplet devices using at least the plurality of D2D interconnects.

4. The apparatus of claim 3 further comprising a server apparatus, the apparatus being configured and operable to the server apparatus using the main bus device.

5. The apparatus of claim 4 wherein the server apparatus is one of a plurality of server apparatuses configured for a server farm within a data center.

6. The apparatus of claim 5 further comprising a power source coupled to the apparatus.

7. The apparatus of claim 1 further comprising an aggregate of transformer devices, the transformer devices comprising a plurality of transformers each of which is stacked in a layer by layer ranging from three (3) to M, where M is an integer up to 128.

8. The apparatus of claim 7 wherein each of the plurality of transformers is configured within one or more DIMC devices such that each of the transformers comprises a plurality of matrix multipliers including a query key value (QKV) matrices configured for an attention layer of a transformer followed by three fully connected (FC) matrices.

9. The apparatus of claim 8 wherein the DIMC device is configured to accelerate the transformer and further comprises a dot product of QKT followed by a softmax (QKT/square root (dk))V.

10. The apparatus of claim 9 wherein each of the slices includes a single input multiple data (SIMD) device configured to accelerate a computing process of the softmax.

11. The apparatus of claim 1 wherein each of the chiplets comprises four tiles arranged symmetrical to each other, each of the tiles comprises four slices.

12. The apparatus of claim 1 wherein the DIMC device is configured to support one or more block floating point data types using a shared exponent.

13. The apparatus of claim 12 wherein the DIMC device is configured to support a block structured sparsity.

14. The apparatus of claim 1 further comprising a network on chip (NoC) device configured for a multicast process and coupled to each of the plurality of slices.

15. The apparatus of claim 1 wherein the one or N chiplets are configured to process a workload of a transformer,
   wherein the transformer includes a plurality of transformer layers, each of the transformer layers having an attention layer associated with a portion of the workload; and
   wherein each attention layer is mapped on to one of the plurality of slices using the global RISC interface to communicate with the CPU associated with the tile of the slice to process the portion of the workload associated with the attention layer.

16. A chiplet device comprising:
   a plurality of tiles, each of the tiles comprising
   a plurality of slices,
   a central processing unit (CPU) coupled to the plurality of slices, and
   a hardware dispatch device coupled to the CPU;
   a first clock configured to output a clock signal ranging from 0.5 GHz to 4 GHz;
   a plurality of die-to-die (D2D) interconnects coupled to each of the CPUs in each of the tiles;
   a peripheral component interconnect express (PCIe) bus coupled to the CPUs in each of the tiles;
   a dynamic random access memory (DRAM) interface coupled to the CPU in each of the tiles;
   a global reduced instruction set computer (RISC) interface coupled to each of the CPUs in each of the plurality of tiles;
   wherein each of the slices includes a digital in memory compute (DIMC) device configured to allow for a throughput of one or more matrix computations provided in the DIMC device such that the throughput is characterized by 512 multiply accumulates per a clock cycle;
   wherein the DIMC device is configured to accelerate the one or more matrix computations for a generative AI application;

wherein each DIMC is coupled to a second clock configured at an output rate of one half of the rate of the first clock; and a substrate member configured to provide mechanical support and having a surface region and an interposer, the surface region being coupled to support the chiplet device, and the one or N chiplets being coupled to each other using the interposer.

17. The device of claim 16 further comprising an aggregate of transformer devices, the transformer devices comprising a plurality of transformers each of which is stacked in a layer by layer ranging from three (3) to N, where N is an integer up to 128.

18. The device of claim 17 wherein each of the plurality of transformers is configured within one or more DIMC devices such that each of the transformers comprises a plurality of matrix multipliers including query key value (QKV) matrices configured for an attention layer of a transformer followed by three fully connected matrices (FC).

19. The device of claim 18 wherein the DMIC device is configured to accelerate the transformer and further comprises a dot product of QKT followed by a softmax (QKT/square root (dk)) V.

20. The device of claim 19 further comprise a single input multiple data (SIMD) device configured to accelerate a computing process of the softmax.

21. The device of claim 16 wherein each of the chiplets comprises four tiles arranged symmetrical to each other, each of the tiles comprises four slices.

22. The device of claim 16 wherein the DIMC device is configured to support one or more block floating point data types using a shared exponent.

23. The device of claim 16 wherein the DIMC device is configured to support a block structured sparsity.

24. The device of claim 16 further comprising a network on chip (NoC) device configured for a multicast process and coupled to each of the plurality of slices.

25. The device of claim 16 being configured to process a workload of a transformer;
wherein the transformer includes a plurality of transformer layers, each of the transformer layers having an attention layer associated with a portion of the workload; and
wherein each attention layer is mapped on to one of the plurality of slices using the global RISC interface to communicate with the CPU of the tile associated with the slice to process the portion of the workload associated with the attention layer.

26. A chiplet device, the chiplet comprising:
a plurality of tiles, each of the tiles comprising:
a plurality of slices,
a reduced instruction set computer (RISC) central processing unit (CPU) coupled to the plurality of slices and a dispatch engine, and
a hardware dispatch device coupled to the RISC CPU;
a first clock configured to output a clock signal ranging from 0.5 GHz to 4 GHz;
a plurality of die-to-die (D2D) interconnects coupled to each of the RISC CPUs in each of the tiles, the plurality of D2D interconnects being configured with single-ended signaling;
a peripheral component interconnect express (PCIe) bus coupled to each of the RISC CPUs in each of the tiles;
a dynamic random access memory (DRAM) interface coupled to each of the RISC CPUs in each of the tiles; and
a global RISC CPU coupled to each of the RISC CPUs in each of the tiles;
wherein each of the slices includes a digital in memory compute (DIMC) device configured to allow for a throughput of one or more matrix computations provided in the DIMC device such that the throughput is characterized by 512 multiply accumulates per clock cycle;
wherein the DIMC device is configured to accelerate the one or more matrix computations for a generative AI application;
wherein each DIMC device is coupled to a second clock configured at an output rate of one half of the rate of the first clock;
wherein each of the slices includes a single input multiple data (SIMD) processor coupled to an output of the DIMC device and configured to process one or more non-linear operations and one or more linear operations on a vector process; and
wherein each of the slices includes a data reshape engine (DRE) device coupled to the DIMC device and the SIMD processor and configured to be operable with a transpose process and other data layout changes.

* * * * *